B. DONOHUE.

GAS-BURNER.

No. 7,470. Reissued Jan. 23, 1877.

Witnesses:

Henry Eichling.
Edward Holly

Inventor:

Bernard Donohue
per James A. Whitney
Atty.

N. PETERS, PHOTO-LITHOGRAPHER, WASHINGTON, D. C.

UNITED STATES PATENT OFFICE.

BERNARD DONOHUE, OF YONKERS, NEW YORK.

IMPROVEMENT IN GAS-BURNERS.

Specification forming part of Letters Patent No. 157,278, dated December 1, 1874; reissue No. 7,470, dated January 23, 1877; application filed January 4, 1877.

*To all whom it may concern:*

Be it known that I, BERNARD DONOHUE, of Yonkers, in the county of Westchester and State of New York, have invented an Improvement in Gas-Burners, of which the following is a specification:

This invention comprises, in an attachment for gas-burners, a metallic shell drawn to shape, having sides substantially straight, in combination with a suitable tip, and open at the bottom for attachment over and around an ordinary gas-burner, whereby I am enabled to produce a gas-burner attachment for increasing the quantity of light from a given quantity of gas at an expense of one-half of that involved in the production of any device hitherto proposed for a like purpose.

In another feature of my said invention an ordinary gas-burner is furnished with a surrounding shell, which provides an annular chamber around the burner, and sustains above the said burner a lava tip, internally excavated in a peculiar manner, and slitted for the issue of the gas while burning, it being found, by careful and long-continued experiment, that this combination of parts secures, in the production of a given degree of light, for any stated time, a very great economy of gas as compared with the burners ordinarily in use.

Figure 1:
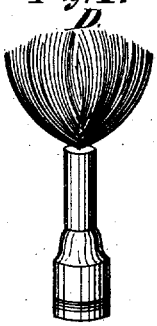
Figure 2:
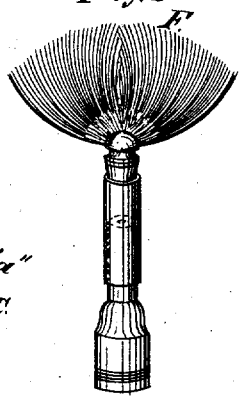
Figure 3:
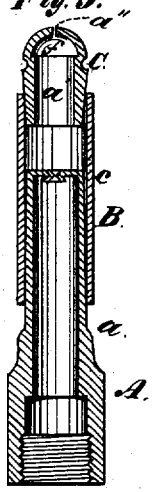

Figure 1 is a side view, including a burner, made according to my invention; and Fig. 2 shows one of the common variety, thus representing the comparative magnitude of the two flames from the consumption of equal volumes of gas per hour. Fig. 3 is a vertical transverse section, on an enlarged scale, of a burner made according to my invention.

A is a common fish-tail or bat's-wing burner, attached, of course, to any usual or suitable gas-fixture when in use. This burner A has externally the ordinary tapering form from its top or upper extremity to the shoulder *a*. B is a cylindrical shell, of such diameter that when placed over or upon the burner A its lower end will clasp tightly upon the enlarged portion of the burner, above the shoulder *a*, just mentioned, and thereby insure the retention of the shell with its axis coincident with that of the burner, the tapering form of that portion of the burner within the shell causing an annular chamber, *c*, to be formed between the burner and the shell. This shell is "drawn" to shape; its sides are substantially straight, and it is itself made open at top to receive the tip C, and at bottom in order that it may be attached to the burner A. The top of the shell is ordinarily about one-half inch above that of the burner, and has fitted into it the lava tip C. This tip is of tapering form, in order to fit readily into the shell, is hollow, as shown at *a'*, and has the usual slit *a''* for the issue of the gas, and is recessed or excavated internally, as shown at *f*, an annular groove extending quite around the interior of the tip, at the junction of the concavo-convex top thereof and the sides of the same. The gas issuing from the burner A passes into the chamber *c*, and into the interior of the lava tip, including the excavation or groove *f* of said tip, and thence outward through the slit *a''*, above which it is ignited to give the requisite illuminating-flame.

In this description I accurately set forth the construction and operation of my invention without elaborating theories to account for the unquestionably advantageous results I have obtained by its use. For example, Fig. 1 shows at D the size of the flame from an ordinary burner without any improvement, as compared with the flame, F, of such a burner when fitted or furnished with my invention.

In practice, I have found the economy of gas resulting from the adoption of my invention to be so considerable that a two-foot burner fitted with my said improvement may be substituted for a four-foot or ordinary burner without the same, a three-foot burner of the one for a five-foot, and a four-foot for a six-foot, without any appreciable difference in the quantity or intensity of the light emitted.

I believe that the ascertained utility of my said invention is very largely dependent upon the relative positions of the parts described, especially that of the excavation or groove *f*, with reference to the orifices of the burner A, the space afforded within the lava tips, and the slit *a''* of the latter, the material of which the latter is made also having an important bearing upon the utility of the device, inasmuch as it resists that tendency to corrosion and change in the minute and delicate proportion of the parts upon which, as aforesaid, the efficacy of the invention is believed to depend.

What I claim as my invention is—

1. In an attachment for gas-burners, the metallic shell drawn to shape, having sides substantially straight and open at bottom for attachment to the burner, in combination with a tip, substantially as and for the purpose set forth.

2. The sheet-metal tube B, constructed with a plain exterior surface, in combination with the burner-tip C, having excavation *f* and opening *a''*, said parts being constructed and adapted to be applied by a slip-joint to the stem of an ordinary gas-burner, substantially in the manner herein shown and described.

B. DONOHUE.

Witnesses:
EDWARD HOLLY,
H. WELLS, Jr.